UNITED STATES PATENT OFFICE.

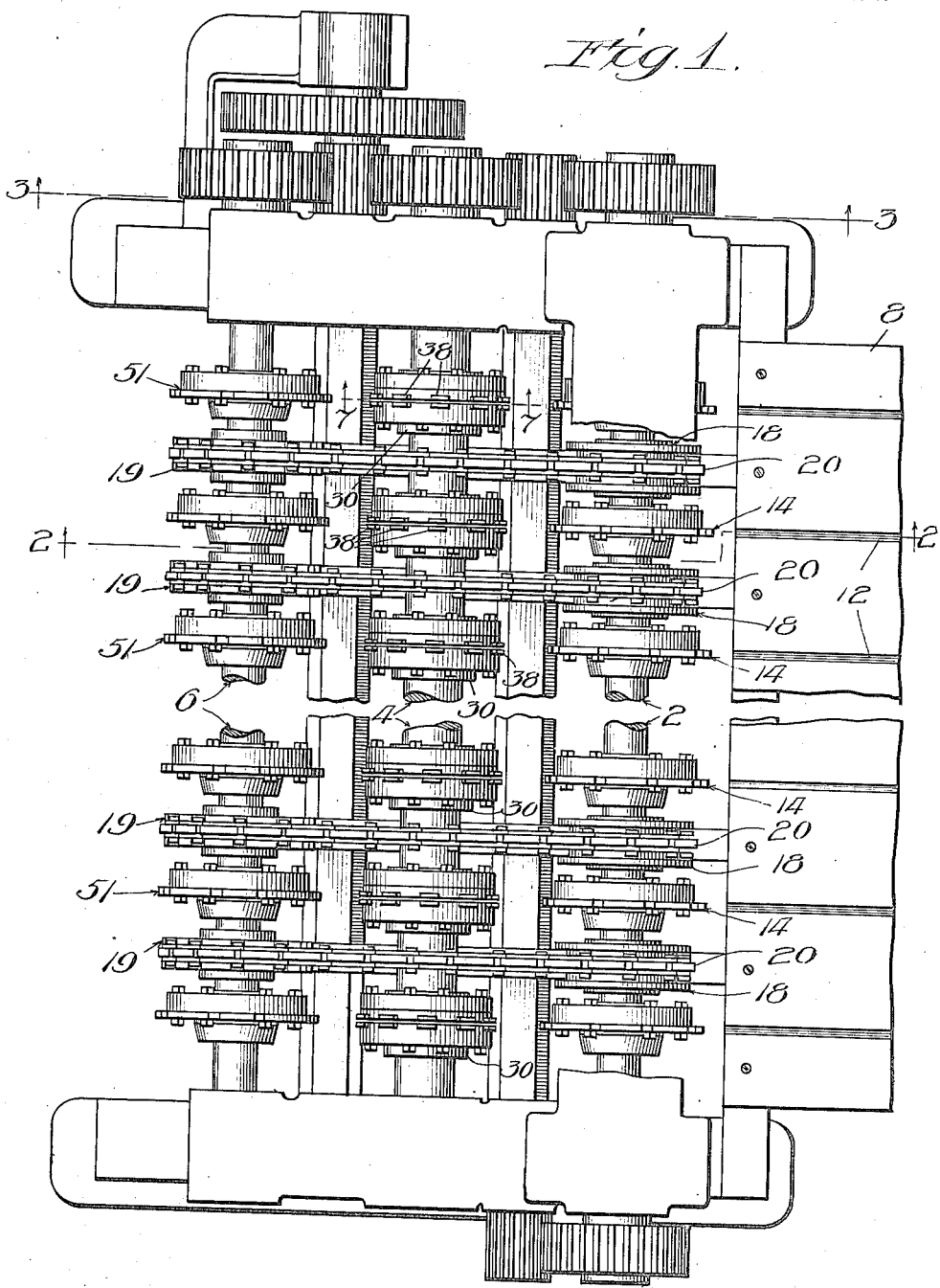

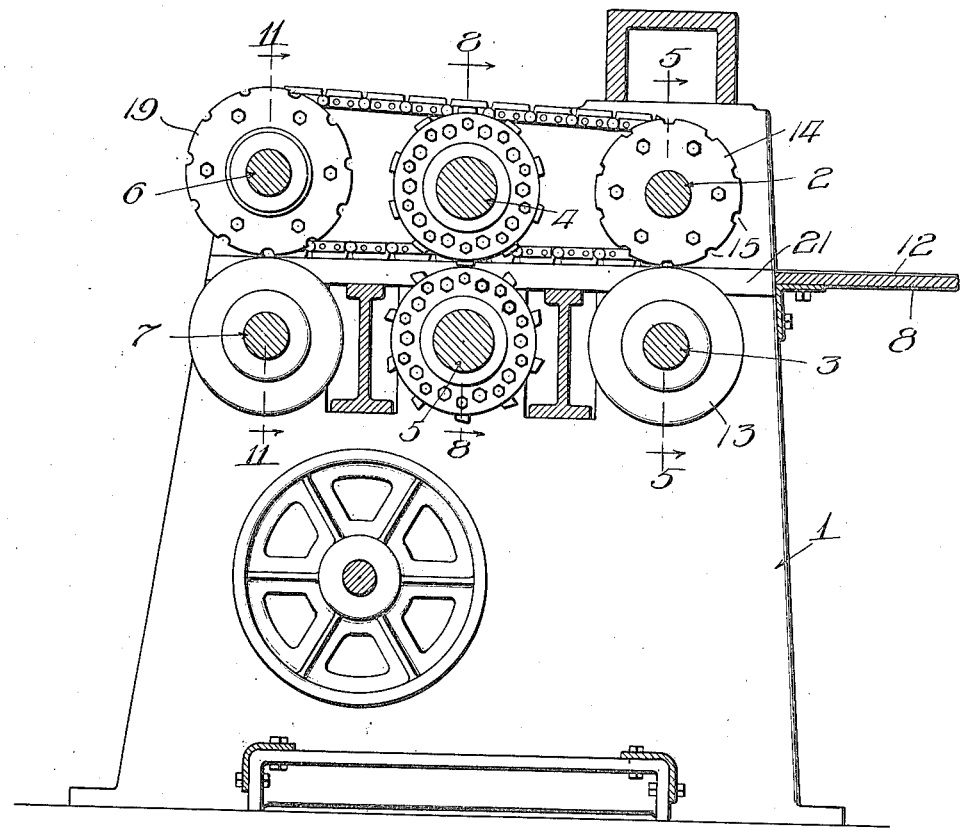

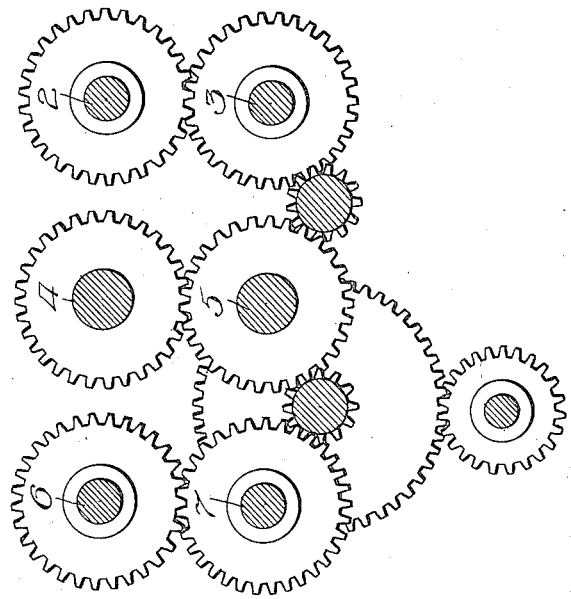
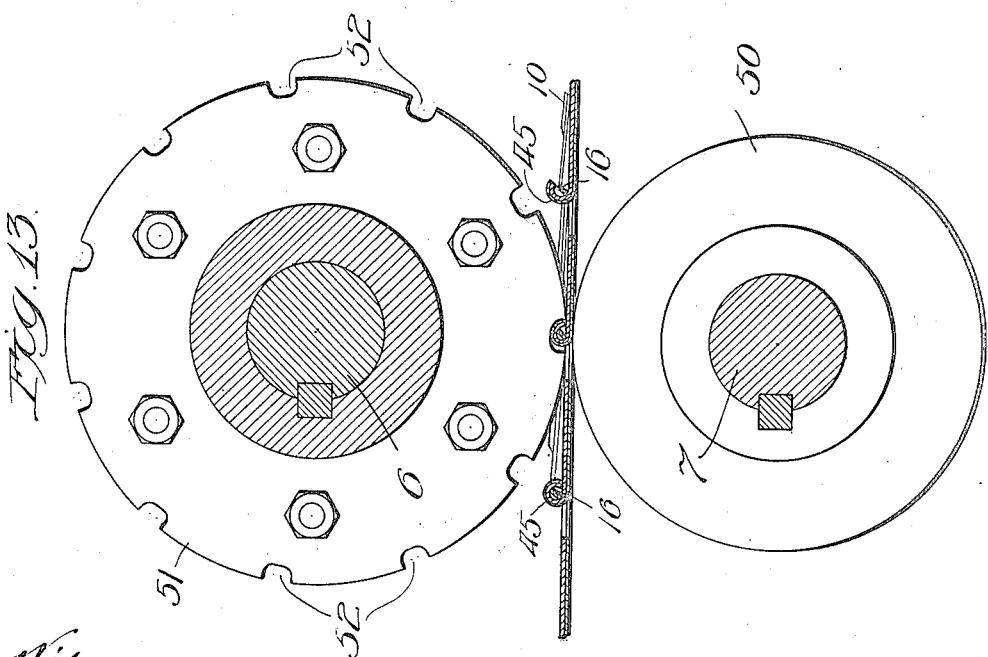

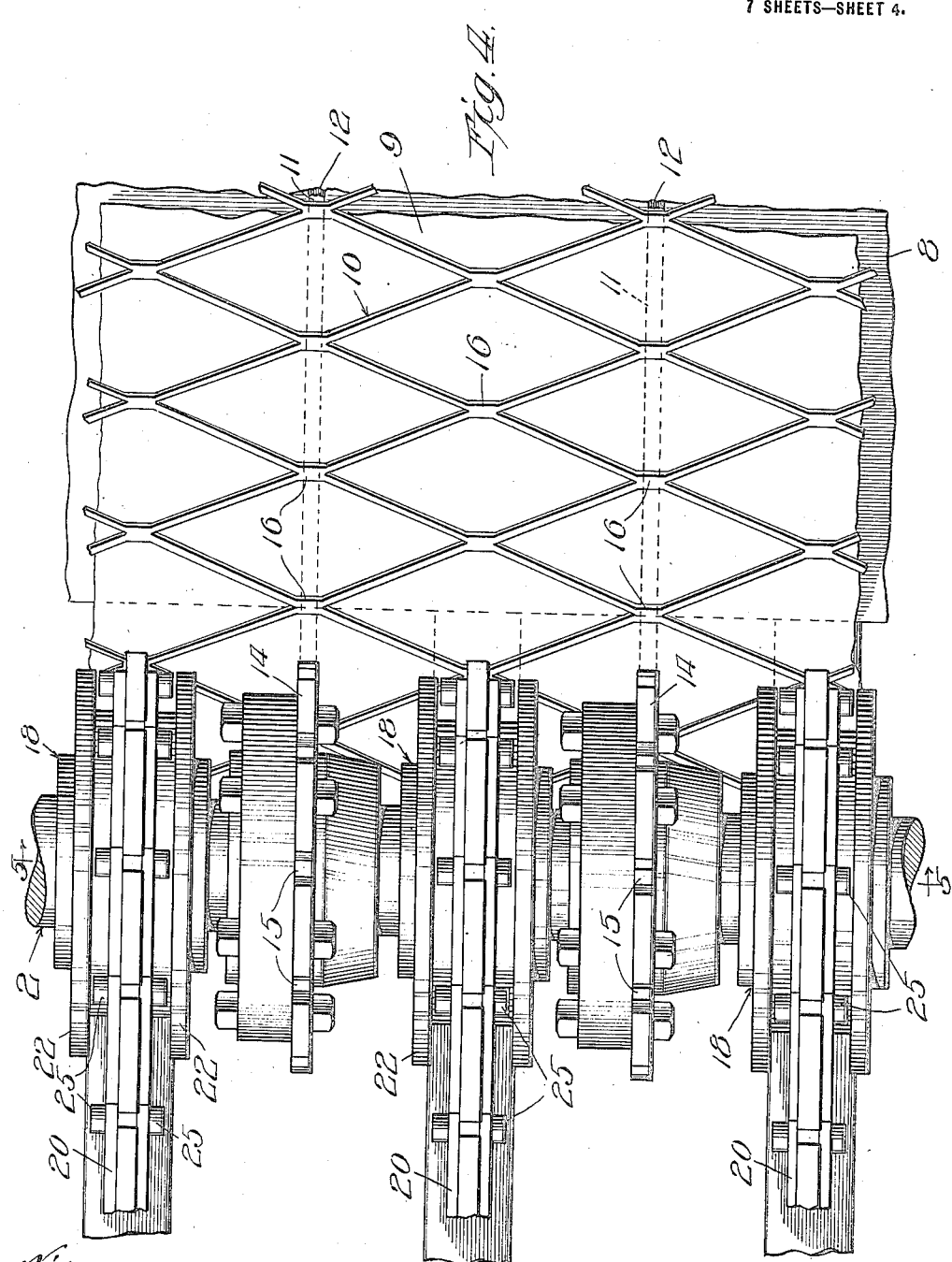

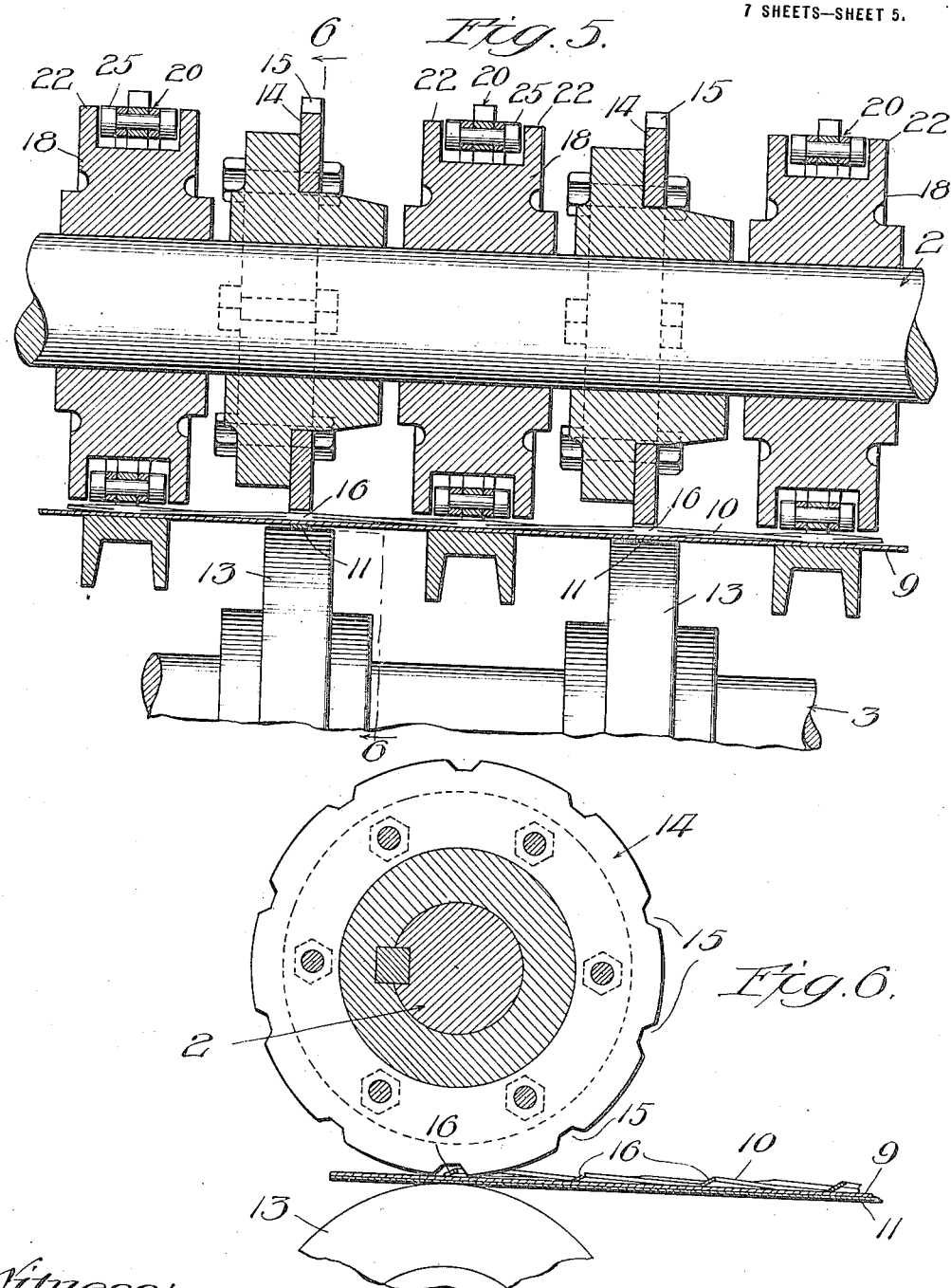

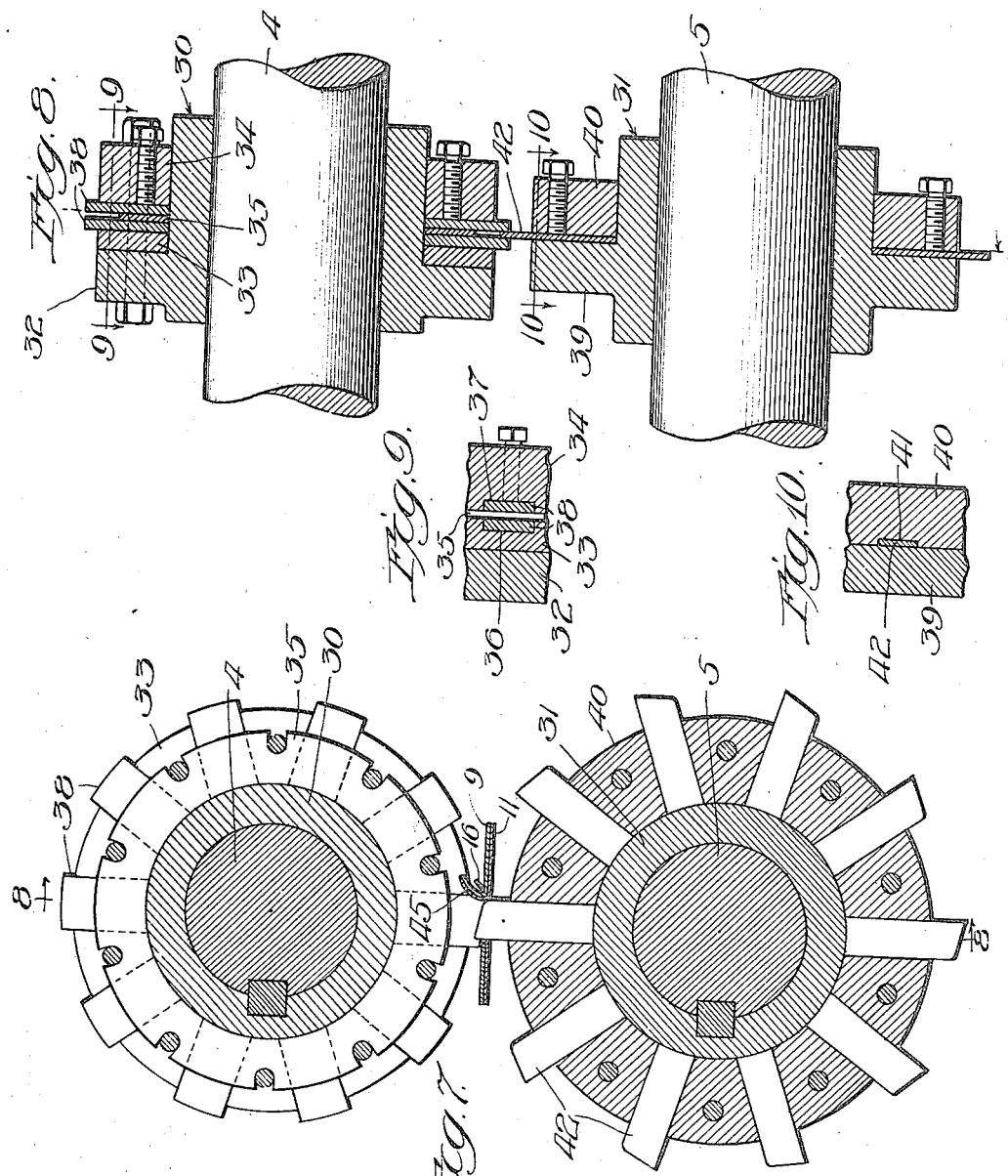

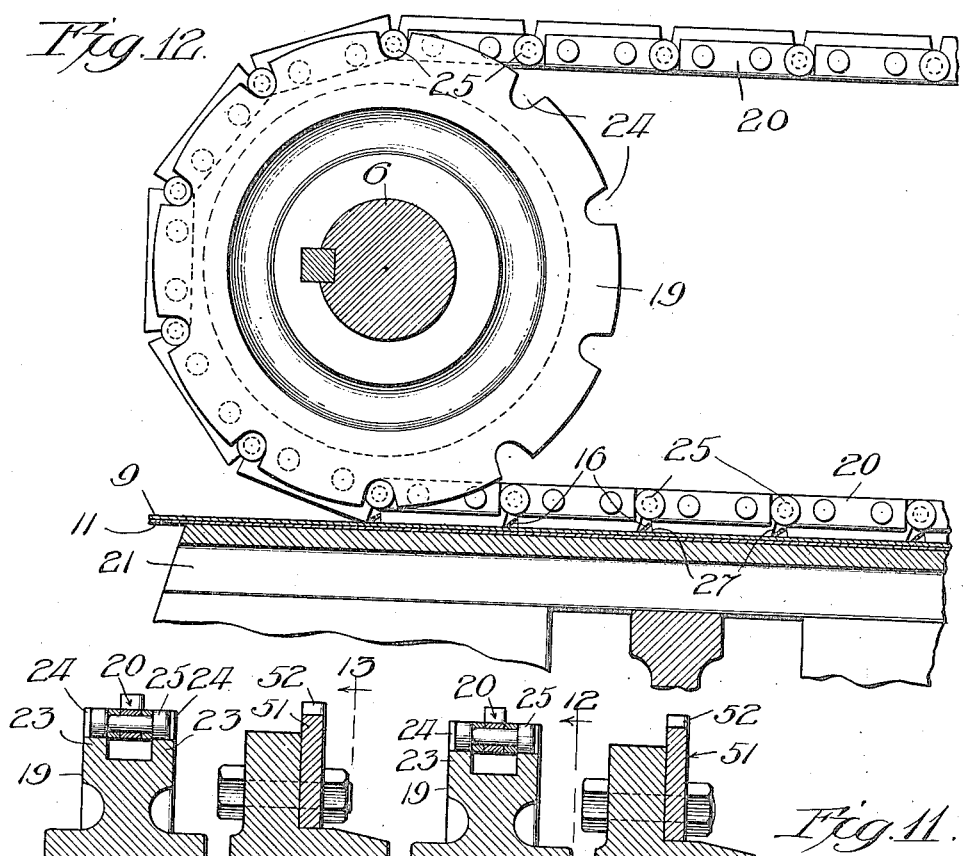
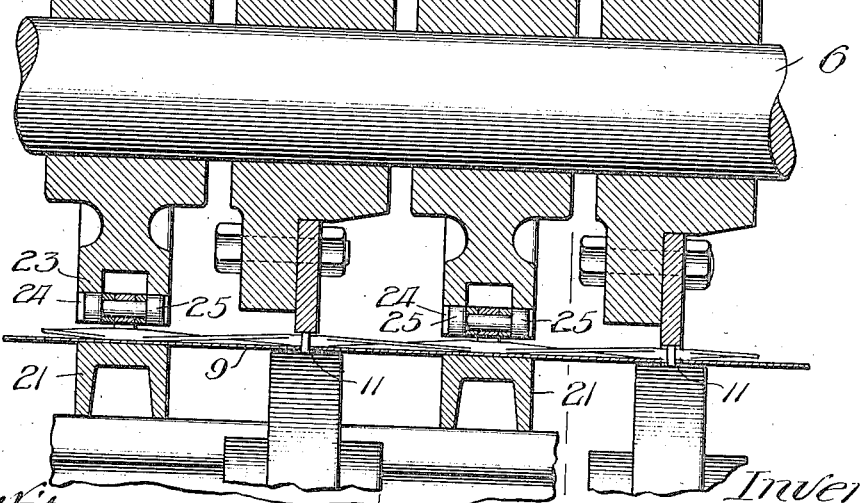

FRED C. AREY, OF OAK PARK, ILLINOIS.

MACHINE FOR MAKING REINFORCED SHEATHING.

1,254,299.     Specification of Letters Patent.     Patented Jan. 22, 1918.

Application filed October 29, 1917. Serial No. 198,921.

*To all whom it may concern:*

Be it known that I, FRED C. AREY, a citizen of the United States, residing at Oak Park, county of Cook, State of Illinois, have invented a certain new and useful Improvement in Machines for Making Reinforced Sheathing, and declare the following to be a full, clear, and exact description of the same, such as will enable others skilled in the art to which it pertains to make and use the same, reference being had to the accompanying drawings, which form a part of this specification.

There has come into use a building material consisting of waterproof paper or felt associated with metallic reinforcing adapted to be embedded in concrete plaster or other plastic material. The object of the present invention is to produce a simple and novel machine for effectively and economically securing together the felt or paper and the metal reinforcing element in material of the character outlined above.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a top plan view of a machine arranged in accordance with a preferred form of the present invention, parts being broken away;

Fig. 2 is a section taken approximately on line 2—2 of Fig. 1;

Fig. 3 is a section taken approximately on line 3—3 of Fig. 1;

Fig. 4 is a top plan view on an enlarged scale of a fragment of the front end of the machine, showing the work in place therein;

Fig. 5 is a section taken approximately on line 5—5 of Figs. 2 and 4;

Fig. 6 is a section taken approximately on line 6—6 of Fig. 5;

Fig. 7 is a section on the same scale as Figs. 4 to 6 taken approximately on line 7—7 of Fig. 1;

Fig. 8 is a section taken approximately on line 8—8 of Figs. 2 and 7;

Fig. 9 is a section on line 9—9 of Fig. 8;

Fig. 10 is a section on line 10—10 of Fig. 9;

Fig. 11 is a section taken approximately on line 11—11 of Fig. 2 on the same scale as Figs. 5 to 10;

Fig. 12 is a section taken approximately on line 12—12 of Fig. 11; and

Fig. 13 is a view of the riveting rolls at the upper left hand corner of Fig. 2, on an enlarged scale, and showing the work in position, or, viewed in another aspect, Fig. 13 is a section approximately on line 13—13 of Fig. 11.

Referring to the drawings, 1 represents a suitable frame structure supporting six heavy shafts or rolls grouped in pairs of each of which one shaft or roller lies directly above the other. The rolls 2 and 3 adjacent to the front side or end of the machine are feed rolls; the rolls 4 and 5 are punching rolls; and the rolls 6 and 7 are riveting rolls. There is a table, 8, supported on the frame in advance of the feed rolls, in position to support the work and permit it to be fed between the feed rolls.

The product which the specific machine illustrated is intended to produce consists of a sheet of fabric made of paper, felt or wood pulp on one side of which lies a sheet of expanded metal and on the other side of which are arranged longitudinal metal holding strips from which tongues are punched through the fabric sheet to engage with the keys at the junctures of the intersecting strands in the expanded metal. The three sets of rolls are therefore provided with suitable devices for feeding the work, punching the rivet elements, and finally clenching the latter.

The elements which go to make up the work are best shown in Fig. 4: 9 representing the fabric, 10 the expanded metal and 11 the holding strips. The expanded metal is of the diamond mesh type and is attached to the fabric along alternate rows of keys between the strands. The table 8 is therefore provided with parallel grooves, 12, extending at right angles to the axes of the rolls and spaced apart from each other a distance equal to the length of that diagonal of each diamond shaped mesh which lies parallel to the axes of the rolls as the work is fed into and passes through the machine. The punching and riveting devices on the rolls are consequently disposed in alinement with the grooves in the table as are also some of the feeding devices on the first set of rolls. Additional feeding devices extending from the front end to the back end of the machine are disposed in planes midway between consecutive grooves in the table so as to permit them to coöperate with the keys of the expanded metal that are to be left unfastened to the fabric. The one set of feed devices consists simply of a series of cylindrical heads or anvils, 13, on the feed roll 3 and coöperating disks or heads, 14, on the roll 2; the members 14 being provided with peripheral notches, 15, spaced the same distance apart as are the keys, 16, of the expanded metal measured longitudinally of the work, that is, at right angles to the axes of the rolls; the notches being just wide enough and deep enough to permit the keys to be received therein so that the expanded metal acts somewhat in the nature of a sprocket chain passing over a sprocket wheel and is fed positively, and without danger of slippage, into and through the machine.

The second set of feeding devices consist of cylindrical heads or drums, 18, fixed upon the roll 2 in alternating relation to the heads 14 as shown best in Fig. 5; together with heads or drums, 19, arranged on the shaft 6 as best shown in Figs. 11 and 12, directly behind the corresponding elements, 18; endless sprocket chains, 20, each of which passes around one of the drums 18 and one of the drums 19; and supports or tracks, 21, extending from the table rearwardly to the back end of the machine and each located directly underneath and in proximity to one of the sprocket chains. The drums 18 are simply smooth members preferably provided with flanges, 22, to keep the sprocket chains from slipping off sidewise, while the members 19 are provided with flanges, 23, having grooves or notches, 24, adapted to receive trunnions or rollers, 25, projecting from opposite sides of the sprocket chains and thus constitute sprocket wheels which will positively drive the chains. The sprocket chain is made of links any number of which, preferably one, equal in length to the longitudinal spacing of the keys in the expanded metal; the links being so shaped at their ends that between each pair is formed a notch or recess, 27, open toward the outside so that whenever a section of a sprocket chain is traveling along one of the tracks or supports, 21, the keys of the corresponding rows in the expanded metal of the work lying on the tracks or supports will enter and lie in these notches so that the work will be moved ahead positively and in unison with the feeding movement by the heads 13 and 14.

The devices for punching out the rivets are best illustrated in Figs. 7 to 10. On the shafts 4 and 5, in alinement with the grooves in the table, as heretofore explained, are heads, 30 and 31, respectively; the former carrying the female members and the latter the male members of a set of rotary dies. In the arrangement shown, the member 30 is provided with an annular shoulder or flange, 32, to which the die members are bolted. These die members consist of two thick rings, 33 and 34, slipped upon the member 30 and held in spaced relation to each other by means of a spacing disk, 35. The members 33 and 34 have registering radial grooves, 36 and 37, respectively, in their adjacent faces, the grooves being spaced to correspond to the longitudinal spacing of the keys in the expanded metal. In each of the grooves is a piece of hardened steel, 38, of the same cross section as the groove and of a length sufficient to permit it to project for some distance beyond the peripheries of the members 33 and 34. The member 31 is provided with a flange, 39, against which is secured a thick ring, 40, having in the face next to the flange a series of radial grooves, 41, spaced in the same way as the grooves 36 and 37. In each of the grooves, 41, is a punch, 42, somewhat narrower than the members 38 and of a thickness equal to the thickness of the spacer 35 between the members 38.

The parts are so adjusted that when the rolls 4 and 5 revolve, each punch enters into the space between the corresponding pair of die members and, if there is work passing through the machine, each punch cuts out of the corresponding holding strip, 11, of the work an ear, 45, which is forced upwardly through the fabric sheet and bent partially over one of the keys 16 in the expanded metal. The parts are of course so adjusted that the keys in the expanded metal are brought into just the proper relation to the punching dies to permit the ears to be punched up past the same.

After the work leaves the punching dies it reaches the riveting dies, 7, best shown in Figs. 11 and 13. The riveting dies are very similar to the feeding heads 13 and 14 heretofore described, each comprising a smooth cylindrical anvil or head, 50, on the roll 7 and a coöperating disk or head, 51, on the roll 6; the member 51 having peripheral notches, 52, spaced to correspond with the longitudinal spacing of the keys in the expanded metal and of such depth that the partially bent tongues or rivets, 45, are completely clenched over the keys of the expanded metal as the work passes through the riveting dies.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. I a machine of the character described, means for feeding a holding strip, a sheet of fabric, and an openwork metal sheet superimposed one upon the other; means for punching out tongues from the holding strip and driving them through said sheets; and means for clenching said tongues over portions of the metal sheet.

2. In a machine of the character described, means for feeding in unison a plurality of parallel metal strips, a sheet of fabric lying upon said strips, and an openwork metal sheet lying upon said fabric sheet; and means for punching tongues from said holding strips and carrying them through and clenching them above said sheets.

3. In a machine of the character described, means for feeding in unison with each other a holding strip, a sheet of fabric, and a sheet of expanded metal lying one upon the other; means for punching tongues out of the holding strip and forcing them through said sheets in proximity to strands in the expanded metal; and means for clenching said tongues over the strands in proximity to which they lie.

4. In a machine of the character described, means for feeding in unison with each other a holding strip, a sheet of fabric, and a sheet of metal in the form of strands connected together to form an open mesh, lying one upon the other; means for punching tongues from the holding strip and carrying them through said sheets in proximity to points at which the strands of the upper sheet are joined together; and means for clenching said tongues over the strands at the aforesaid points.

5. In a machine of the character described, means for feeding a holding strip, a sheet of fabric, and a sheet of expanded metal made up of strands connected together by keys to form a diamond mesh, lying one upon the other; means for punching tongues from the holding strip and forcing them through the sheets in proximity to certain of said keys, and means for clenching said tongues over the last mentioned keys.

6. In a machine for securing together a holding strip, a sheet of fabric, and a sheet of expanded metal made up of strands connected by keys to form a diamond mesh, lying one upon the other; means adapted to engage said keys to feed the work through the machine, and means for punching tongues out of the holding strip and bending them around certain of the keys to fasten the strip and the two sheets together.

7. In a machine for securing together a holding strip, a sheet of fabric, and a sheet of expanded metal made up of strands connected by keys to form a diamond mesh, lying one upon the other: means adapted to engage alternate longitudinal rows of keys to feed the work continuously through the machine; and means adapted to act along the lines of the remaining longitudinal rows of keys to punch tongues out of the holding strip and clench them around the keys.

8. In a machine for securing together a holding strip, a sheet of fabric, and a sheet of expanded metal made up of strands connected by keys to form a diamond mesh, lying one upon the other: means adapted to engage alternate longitudinal rows of keys to feed the work continuously through the machine; means acting along the lines of the remaining longitudinal rows of keys for punching tongues out of the holding strip and forcing them through the sheets in the vicinity of the keys; and means for subsequently clenching the tongues over the keys adjacent to which they lie.

9. In a machine for securing together a holding strip, a sheet of fabric, and a sheet of expanded metal made up of strands connected by keys to form a diamond mesh, lying one upon the other; means including sprocket chains having parts adapted to engage the keys in some of the longitudinal rows in the expanded metal to feed the work through the machine, and means adapted to punch tongues from the holding strip along the lines of other rows of keys and forcing the tongues through the sheets and clenching them over the latter keys.

10. In a machine for securing together a holding strip, a sheet of fabric, and a sheet of expanded metal made up of strands connected by keys to form a diamond mesh, lying one upon the other; tracks on which said sheets of fabric are adapted to rest and between which said strip is adapted to pass, means overlying said tracks and adapted to engage the keys of the expanded metal for feeding the sheets through the machine; and rotary means between the tracks for punching tongues from said strip, forcing them through the sheets, and clenching them about the strands of the expanded metal.

11. In a machine for securing together a holding strip, a sheet of fabric, and a sheet of expanded metal made up of strands connected by keys to form a diamond mesh, lying one upon the other; a table arranged in front of the machine and having a groove in its top for receiving and guiding said strip, means in alinement with said groove for punching tongues from said strip, forcing them through the sheets and clenching them over the expanded metal, and other means engaging with said sheets for feeding the work through the machine.

In testimony whereof, I sign this specification.

FRED C. AREY.